Sept. 17, 1940.  J. T. WOOD  2,215,417
APPARATUS AND METHOD FOR CONTROLLING THE FEEDING OF GLASS CHARGES
Filed Nov. 25, 1938  3 Sheets-Sheet 1

Inventor:
John Thomas Wood,
By Potter, Pierce & Scheffler
Attorneys

Sept. 17, 1940. J. T. WOOD 2,215,417
APPARATUS AND METHOD FOR CONTROLLING THE FEEDING OF GLASS CHARGES
Filed Nov. 25, 1938 3 Sheets-Sheet 2
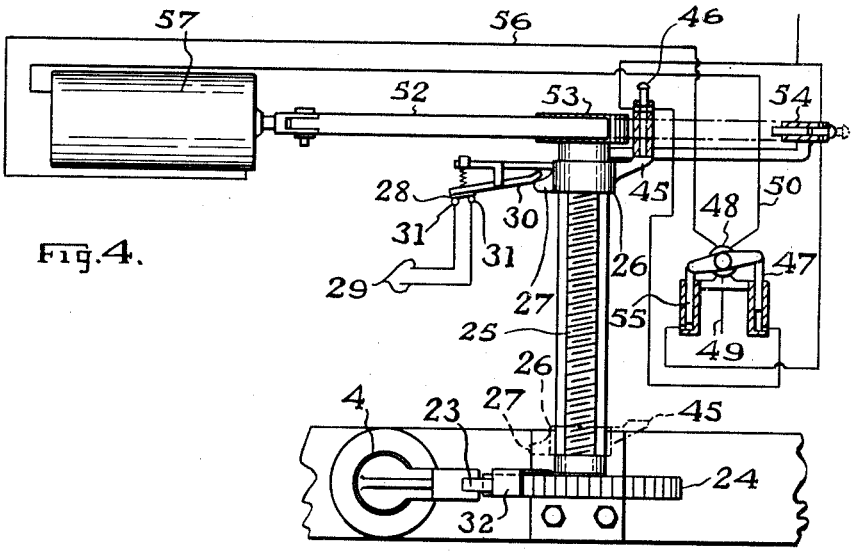
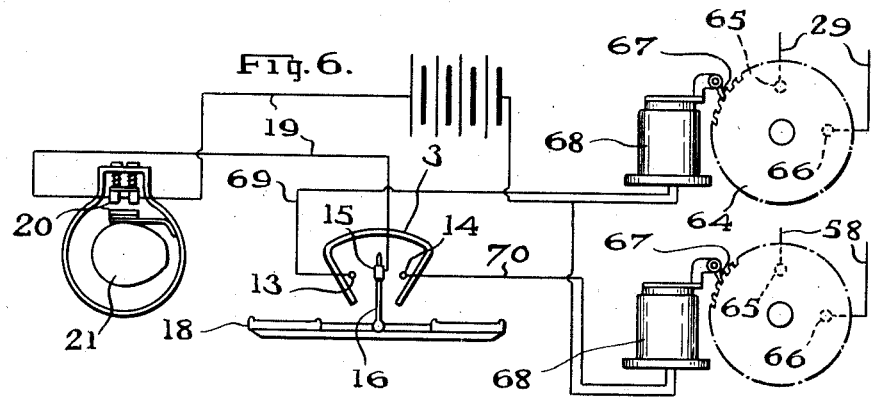
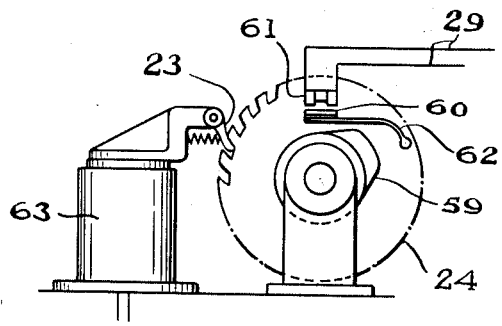
Inventor:
John Thomas Wood,
By Potter, Pierce + Scheffler,
Attorneys.

Sept. 17, 1940.   J. T. WOOD   2,215,417
APPARATUS AND METHOD FOR CONTROLLING THE FEEDING OF GLASS CHARGES
Filed Nov. 25, 1938   3 Sheets—Sheet 3
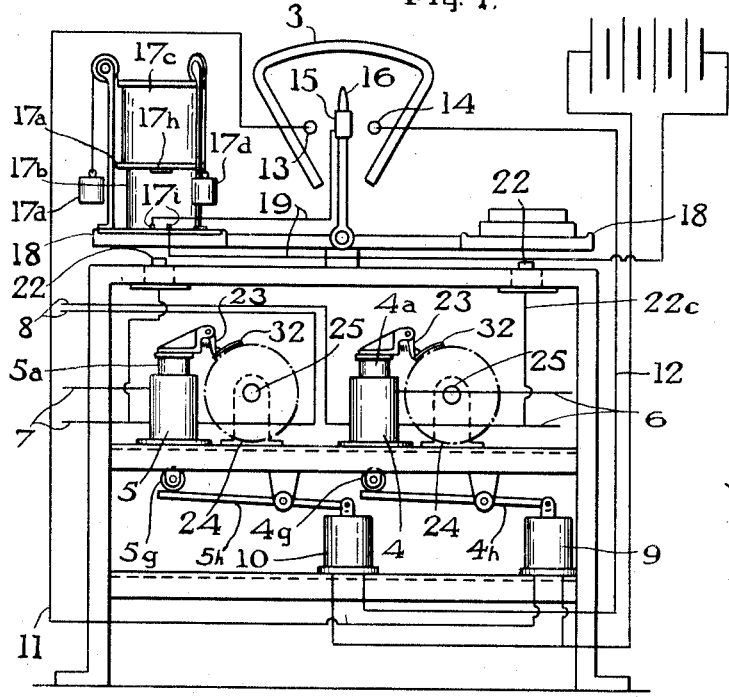
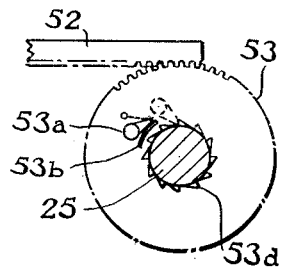
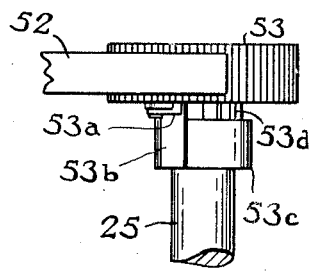
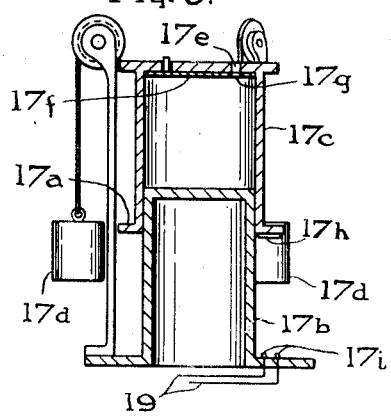
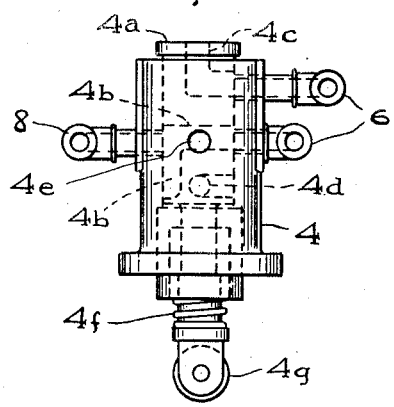
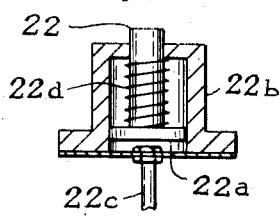

Patented Sept. 17, 1940

2,215,417

UNITED STATES PATENT OFFICE 2,215,417

APPARATUS AND METHOD FOR CONTROLLING THE FEEDING OF GLASS CHARGES

John Thomas Wood, Bootle, Liverpool, England

Application November 25, 1938, Serial No. 242,428
In Great Britain November 9, 1937

12 Claims. (Cl. 49—55)

This invention relates to glass feeding devices of the type wherein the flow of glass from a forehearth, channel, conduit or the like is controlled by a gob control device or devices.

Feeders of the above type are associated with forming machines for the manufacture of bottles or other containers or articles (hereinafter referred to as containers) and in practice it is found necessary to check the weight of the containers frequently. This is due to the temperature of glass in the forehearth or furnace and/or other furnace conditions varying from time to time and such conditions cause the weight of the glass being fed to vary automatically. For example, the viscosity of the glass is changed, and when the temperature rises the molten glass becomes more fluid and the weight fed is increased; on the other hand when the temperature is down the glass becomes more stiff and the weight fed is reduced.

It is of the greatest importance that the temperature of the glass should remain constant and it will readily be understood that should the temperature be incorrect the machine operator has to correct this by manipulating the heating means. This adjustment of the temperature is usually obtained by hand operated means and this entails a considerable time over the working period of the machine due to the number of times it is found necessary to adjust the temperature.

Referring now to the accompanying drawings in which several embodiments are shown by way of example only:

Fig. 4 is a plan view similar to Fig. 3 but with the electrical circuit for the burner closed;

Fig. 5 is a front view of a modified main control apparatus for the burners;

Fig. 6 is a diagrammatic view showing the weighing apparatus wired to a delayed action switch in the circuit of the burner control means.

Fig. 7 is an enlarged diagrammatic view showing a modification of Fig. 1;

Fig. 8 is an enlarged view of a double acting fluid control valve;

Fig. 9 is an enlarged sectional view of an air dash-pot forming a delayed action switch;

Fig. 10 is an enlarged sectional view of a fluid operated stop for the weighing apparatus;

Figs. 11 and 12 are respectively a front view and a plan of a free-wheel device incorporated in the main control apparatus.

Figure 1:
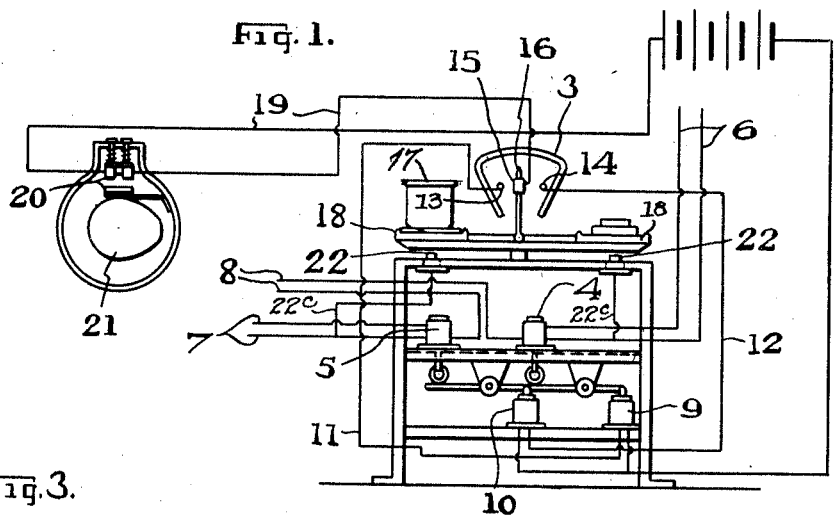
Fig. 1 is a diagrammatic view showing the weighing apparatus, control circuits and fluid control means.

In the embodiment of this invention shown in Figs. 1 to 4 of the drawings for a glass feeder employing oil or gas burners 2 for heating the glass, the oil or gas and air feed to the burners is controlled automatically by means operated by weighing apparatus 3 for the glass article formed from the gob.

This embodiment is particularly suitable for cooperation with the apparatus described in my co-pending application, Serial No. 226,001 filed August 20, 1939. In such application the double acting valves 4, 5, are employed for controlling the fluid feed through the tubes 6, 7, to fluid cylinders which operate devices for controlling automatically the part, such as a plunger, controlling the delivery of the gob of glass from the outlet. The valves 4, 5, have a fluid supply tube 8 and are each operated by a solenoid 9 or 10 connected to an electrical circuit 11 or 12 having contacts, 13, 14 associated with the contacts 15 on the pointer 16 of the weighing means 3. The valve 4 (or 5) is shown more fully in Fig. 8 and includes a plunger 4a with a passage 4b which communicates with the inlet tube 8 and the lower of the aforesaid tubes 6. The passage 4b extends downwards so that the tube 8 is always in communication therewith. A further passage 4c communicates with the upper tube 6 and with the top of the plunger 4a. An L-shaped exhaust passage 4d in the plunger is closed when the valve is down as shown, and fluid flows from tube 8 through passage 4b into the lower tube 6, and exhausts back through the upper tube 6 through passage 4c. When the plunger 4a is lifted, the fluid flows from tube 8 through passage 4b into the upper tube 6, and back through the lower tube 6 to exhaust through the passage 4d, which will then be in line with the hole 4e in the valve. The valve plungers 4a, 5a are held down by return springs 4f, and have rollers 4g, 5g in contact with the pivoted levers 4h, 5h which are connected to the solenoids 9, 10.

The weighing apparatus 3 may be of any convenient type and if of the usual pan and weights type shown, the contacts 13, 14 are arranged on each side of the scale beam pointer 16. The arrangement is such that when a container 17 is placed upon its scale pan 18 if it is of correct weight no operation of either of the electric circuits 11, 12 will take place. Should the container be too heavy the scale pan 18 will descend and engage the contact 15 on the pointer 16 with the stationary contact 13 for completing the electrical circuit connected therewith and in this manner the appropriate double acting valve 4 will be operated by its solenoid 9. The solenoids 9 and 10 are normally held down in the position shown by springs or by their own weight so that the valves 4 and 5 are held in the raised position shown in Fig. 7 until either of the solenoids is energized and its core raised to release the valve associated therewith, which latter then falls under action of its spring 4f. In apparatus controlled automatically, to prevent the double acting valves 4, 5, being actuated each time the weighing apparatus shows an incorrect weight or by accidental movement of the scales, the main electrical circuit 19 is broken by a switch 20 operated by a cam 21 on the usual timing machine associated with a glass feeder. The arrangement may be such that at each rotation of the forming machine table one or more bottles may be removed by hand and placed upon the weighing means, or a container may be removed only once during a number of rotations of the table.

When the containers 17 are to be placed on the weighing means by hand, the automatically closed main switch 20 is not suitable in that should an operator fail to place a container on the weighing means at the proper time, the apparatus may be operated automatically for a container underweight. To prevent this, for hand deposited containers, it is preferred to operate the main switch through a delayed action device, as shown in Figs. 7 and 9. For example, an air controlled dash-pot, generally indicated by reference 17a, is used (oil or other fluid dash-pots may be used) comprising, as shown in Fig. 9, an inner cylinder 17b mounted on the scale pan 18 and an outer cylinder 17c enclosing the inner cylinder with a neat sliding fit. The arrangement is, that the outer cylinder 17c is held in a raised normal position by counter-balance weights 17d, (springs or the like may be used) and a container 18 is placed on such cylinder. Immediately weight is placed on the outer cylinder it will descend at a speed determined by the speed at which the air between the two cylinders 17b, 17c is exhausted through an outlet 17e which is furnished with a control shutter 17f apertured at 17g. The delay caused by the settling of the outer cylinder 17c allows the weighing means to assume a correct weighing position before the outer cylinder closes the main switch which may comprise a strip 17h on the cylinder for engaging the two contacts 17i.

To retain the weighing means at a given reading during each weighing operation, a stop may be moved automatically into engagement with one or the other of the scale pans 18. For example, the aforesaid double acting valves 4, 5 are arranged to supply air to spring returned pistons 22, beneath the scale pans. In this manner, should a heavy container be weighed, the stop piston 22 beneath the weight scale pan 18 would be raised to prevent the pan's accidental descent during the weighing operation, which would inadvertently break the electrical circuit 11, and vice versa. When the scales are at rest the stops are clear of the scale pans.

The stops are more fully shown in Fig. 10 wherein the piston 22 is shown with a head 22a and carried by a cylinder 22b into which air is admitted from the pipe line 22c which in one case is connected to the lower tube 6 and in the other case to the lower tube 7. Air also exhausts through pipe line 22c back through the valve 4 or 5 to atmosphere and spring 22d returns the piston to its normal position, although its own weight could be utilized.

Figure 2:
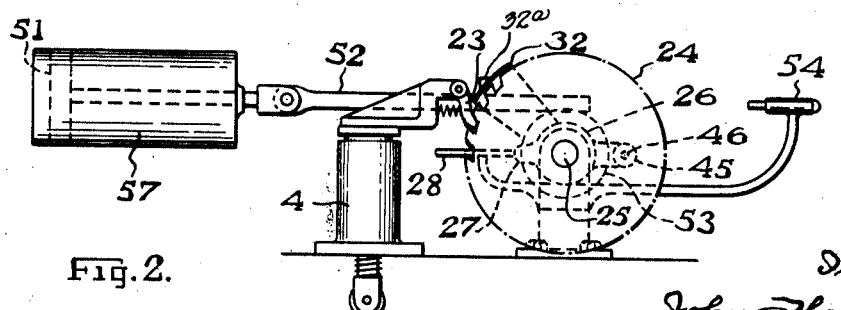
Fig. 2 is a front view of the main control apparatus for the glass heating burners.

In addition to their fluid control action the valves 4, 5 are each provided with a pawl 23 which is mounted to operate a pinion 24 each time the valve 4, or 5 is moved in one direction, say downwardly. The pinion 24 is fixed upon a threaded spindle 25 (or sleeve) which carries a collar 26 provided with a projection 27. Rotation of the spindle 25 moves a collar 26 along it and at a predetermined point the projection 27 moves a contact 28 for closing what may be termed, a temperature control electrical circuit 29. The temperature control contact 28 is carried by a spring controlled pivoted lever 30 and this device with the contacts 31 may be adjustable for adjusting the point of engagement with the collar projection 27. The construction may be such that the electrical contacts 31 are closed when the pawl 23 has operated its pinion 24 a given number of times. To ensure correct engagement between the pawl 23 and the pinion an adjustable shield 32 is adapted to cover some of the pinion teeth. The pawl 23 when in its normal raised position, Fig. 7, rests upon the shield 32 and bears against a stop 32a. When the pawl is caused to descend, it slides off of the shield 32 into engagement with the pinion to actuate the same and when raised to normal position slides back onto the shield and out of engagement with the pinion. Fig. 2 shows the valve 4 in lowered position with the pawl in engagement with the pinion.

Closure of the circuit 29 is arranged to operate control means for the oil or gas burners 2 so that the temperature of the glass is lowered. The control means include valves 33, 34 inserted in the oil or gas and air feed pipes 35, 36 and operable by reversible motors 37, 38 through pinions 39, 40, 41, 42 and racks 43, 44 whose stroke may be adjustably limited in a suitable manner.

To return the collar 26 to its starting position it is arranged after closing the contacts 31 to engage through projection 45 an auxiliary valve 46 (which may be adjustably mounted). Said valve allows compressed air to pass to a plunger 47 of a main rocker valve 48 which in turn allows air to flow from feed pipe 49 to pipe 50 to actuate a piston 51 so that a rack 52 will rotate a pinion 53 (incorporating a free wheel device) on the spindle 25 and thus return the collar 26. At the end of the rack's operating stroke it engages a second auxiliary valve 54 which allows air to pass to the other plunger 55 of the main valve 48 which in turn allows air to pass through the pipe 56 to the cylinder 57 for returning the piston 51. The free-wheel device of pinion 53 is particularly shown in Figs. 11 and 12, and comprises a spring depressed pawl 53a, carried by the pinion, which normally rests upon a stationary shield 53b fixed to a support 53c for the spindle 25. The spindle 25 is thus free to rotate counter-clockwise until the rack 52 is operated to rotate the pinion 53 in a clockwise direction. Such rotation carries the pawl off the shield into engagement with the teeth 53d on the spindle, whereby the latter is rotated also. The arrangement is such that the pinion only rotates part of a revolution in the clockwise direction, and immediately the rack 52 returns to its normal position, the pawl trips over the teeth 53d and returns to rest on the shield ready for a fresh operation.

Should the containers 17 be too light then the opposite action will take place, the contact 14 on the side of the scale pan for the weights will remain closed and the other double acting valve 5 will be actuated. This valve 5 is associated with similar control means to that described for the first valve 4 so that the oil or gas burners 2 will be controlled by the reversible motors 37, 38 through the reversing circuit 58 for increasing the temperature of the glass. Since the control mechanism associated with valve 5 is identical to that shown in connection with valve 4, the same has not been illustrated in the drawings.

In the modification shown in Fig. 5 the aforesaid pinions 24 operated by pawls 23 each have a cam 59 associated therewith to operate the electrical contacts 60, 61 of the electrical circuit 29 or 58 to the burner control means direct. This will dispense with the threaded spindle 25 and other attendant parts and the cams 59 may be made adjustable and/or replaceable in known manner for altering the point of engagement with the electrical contact carrier 62. Further the contacts 60, 61 may be adjustable relative the cam 59 for timing purposes. A solenoid 63 operates the pawl 23 but a double acting valve such as 4 or 5 may be used.

It will readily be understood that any other type of main switch may be incorporated in the electrical circuit so that the burners 2 need not be adjusted each time the weighing apparatus shows an incorrect weight. This main switch may be manually controlled or arranged automatically to operate at given periods.

Figure 3:
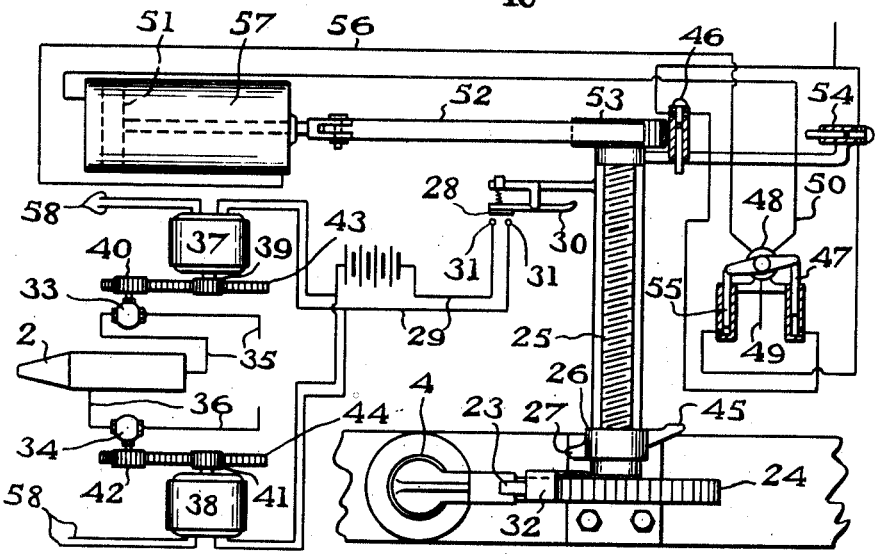
Fig. 3 is a plan view of Fig. 2 showing the connections to the burners.

With the use of a controlled main switch it is apparent that the electrical contacts 13, 14 associated with the weighing apparatus 3 may be wired up through such switch to the control means for the burners 2. In Fig. 6 a controlled switch device is shown comprising pinions 64 each carrying a contact 65 for engagement with a stationary contact 66, and operated by pawls 67 mounted on solenoids 68. Each time the circuit 69 or 70 is energised, when the switch 20 controlled by the cam 21 is closed, by movement of the pointer 16, the appropriate solenoid 68 is operated for rotating the attendant pinion 64 one step of the number required to complete the cycle and engage the contacts 65, 66. It will be understood that means similar to that shown in Figs. 3 and 4 is provided to return the pinions 64 to starting position to separate the contacts after each control cycle is completed.

While preferred embodiments of the invention have been shown and described as applied to the burner controls of glass feeders by way of illustration, it will be understood that various other modifications in the details of construction and operation may be resorted to and that the same may be used in the control of dampers and other adjusting instrumentalities of glass feeders without departing from the spirit of the invention within the scope of the appended claims.

What I claim is:

1. The method of regulating the weight of mold charges delivered by a glass feeder which comprises periodically weighing one of the articles formed from mold charges delivered by said feeder, translating the results of each incorrect weight into a unit effect, separately integrating the unit effects produced by over-weights and under-weights, maintaining the conditions controlling the rate of feed of the glass constant until a predetermined summation of said units has accumulated, and thereupon varying a condition controlling the rate of feed of the glass a predetermined amount for each such predetermined summation of said units.

2. The method as defined in claim 1 in which the supply of heat to the glass is varied.

3. Apparatus for controlling automatically in glass feeding devices the means employed for controlling the heat of the molten glass, said apparatus including weighing apparatus for receiving periodically a glass article formed from a charge delivered by said feeding devices, an electrical circuit associated with said weighing apparatus, means operable by said weighing apparatus adapted to close said electrical circuit when the weight of the article weighed is incorrect, a second electrical circuit for actuating said means for controlling the heat of the molten glass, switch means for energizing said second circuit, operating mechanism for said switch means comprising a switch closing member movable step-by-step from a starting position to a switch closing position, means actuated by the closing of said first mentioned electrical circuit by said weighing apparatus for moving said switch closing member a step in the direction of said switch closing position, and means actuated by movement of said switch closing member to switch closing position for restoring said switch closing member to starting position.

4. Apparatus for controlling automatically in glass feeding devices the means employed for controlling the heat of the molten glass, said apparatus including weighing apparatus for receiving periodically a glass article formed from a charge delivered by said feeding devices, an electrical circuit associated with said weighing apparatus, means operable by said weighing apparatus adapted to close said electrical circuit when the weight of the article weighed is incorrect, a second electrical circuit for actuating said means for controlling the heat of the molten glass, switch means for energizing said second circuit, operating mechanism for said switch means comprising a rotatable threaded spindle, a switch closing member threadedly engaging said spindle and movable therealong between a starting position and a switch closing position, means actuated by the closing of said first mentioned electrical circuit by said weighing apparatus for imparting rotation to said threaded spindle to move said switch closing member a portion of the distance between said positions, and means actuated by movement of said switch closing member to switch closing position for rotating said threaded spindle in the reverse direction to restore said switch closing member to starting position.

5. Apparatus according to claim 4 in which said means for rotating said threaded spindle in the reverse direction for restoring said switch closing member to starting position comprises a fluid operated driving member for said spindle and fluid control valves actuated by said switch closing member for controlling said fluid operated driving member.

6. Apparatus according to claim 4 in which said means for rotating said threaded spindle in the reverse direction for restoring said switch closing member to starting position comprises an electrical control means actuated by said switch closing member.

7. Apparatus according to claim 4 in which said means for imparting rotation to said threaded spindle comprises a pinion carried by said spindle, a pawl adapted to engage said pinion and electrical operating means for said pawl energized by said circuit associated with said weighing apparatus.

8. Apparatus according to claim 4 in which said means for imparting rotation to said threaded spindle comprises a pinion carried by said spindle, a fluid control valve associated with said feeding devices having a movable part, a pawl carried by the movable part of said valve and adapted to engage said pinion, and electrically actuated means energized by the electrical circuit associated with said weighing apparatus for controlling the actuation of said valve.

9. Apparatus according to claim 3 in which said switch closing member comprises cam means.

10. In apparatus according to claim 3, a delayed action switch means in the circuit associated with said weighing apparatus to permit the weighing apparatus to adjust itself to the correct reading before said circuit can be closed.

11. In apparatus as defined in claim 3, a dash-pot device operatively connected with the weighing apparatus, and switch means operated by said dash-pot, said switch means being in the electrical circuit associated with said weighing apparatus, whereby said dash-pot delays closing of said circuit.

12. In apparatus as defined in claim 3, stop means movable into engagement with a part of said weighing apparatus to retain the same in correct weighing position, and means for moving said stop means into operative position upon completion of the circuit associated with said weighing apparatus.

JOHN THOMAS WOOD.